United States Patent
Stonecypher

[11] Patent Number: 5,802,762
[45] Date of Patent: Sep. 8, 1998

[54] RETRACTABLE GREENHOUSE

[76] Inventor: Bob Stonecypher, 1383 Fahlander Dr. S., Columbus, Ohio 43229

[21] Appl. No.: 714,455

[22] Filed: Sep. 16, 1996

[51] Int. Cl.[6] .................................. E04B 7/16; A01G 9/14
[52] U.S. Cl. ...................................................... 47/17; 52/66
[58] Field of Search .................................. 47/17, 26, 63; 52/2, 22, 63, 64, 66, 67, 69, 71, 72, 222

[56] References Cited

U.S. PATENT DOCUMENTS

| | | | |
|---|---|---|---|
| 4,067,347 | 1/1978 | Lipinski | 47/17 X |
| 4,387,533 | 6/1983 | Green et al. | 47/17 |
| 4,706,420 | 11/1987 | Winkler | 47/17 X |
| 4,763,440 | 8/1988 | James | 47/2 |
| 4,794,727 | 1/1989 | Smith | 47/17 |
| 4,798,023 | 1/1989 | Morssinkhof | 47/26 |
| 5,038,517 | 8/1991 | Talbott | 47/17 |
| 5,265,373 | 11/1993 | Vollebregt | 47/17 |
| 5,311,699 | 5/1994 | Huffman | 47/26 |

Primary Examiner—Michael J. Carone
Assistant Examiner—Robert Pezzuto
Attorney, Agent, or Firm—Kremblas, Foster, Millard & Pollick

[57] ABSTRACT

The present invention relates to a retractable greenhouse which is constructed from at lease two left-right horizontal members which are supported at each opposite distal end by a left-right vertical support post and at least two front-rear horizontal members which are supported at each opposite distal end by a front-rear vertical support post. Each front-rear system includes a front-rear cover sheet which may be raised or lowered by a motor. Each left-right system includes a left-right cover sheet which is raised to a left-right horizontal member, travels to another left-right horizontal member (to form a top), then lowers to the ground. This forms a retractable greenhouse.

12 Claims, 7 Drawing Sheets

RETRACTABLE GREENHOUSE

BACKGROUND OF THE INVENTION

1. Field of the Invention

The present invention relates to a retractable greenhouse. More particularly, the present invention relates to retractable greenhouse capable of automatic top, side, front and rear enclosure by cover sheets.

2. Description of the Prior Art

The use of greenhouses is well known in the art. The prior art greenhouses have been restricted in size due to expansionability as well as use during year round weather conditions due to their permanent enclosure. In northern climates, greenhouses are painted with a white Ultra Violet shielding material in the spring and fall climates and can rarely be utilized in the summer without great efforts of removing most if not all of the enclosure panels. The present invention addresses all of the limitations of the prior art and improves upon the greenhouse concept by a modular design.

In Florida, citrus groves have many dead trees, caused by freezing temperatures. To protect groves from freeze damage, grove owners would light fires, mostly smudge pots (a type of oil heater), and old rubber tires, (both are polluters) or spray water over the groves. Not all groves are equipped with extensive sprinkler systems. Protection from wind during cold periods is not a problem. Wind rarely occurs during freezing temperatures in the Florida citrus belt.

If temperatures drop below 27 degrees for three or more hours, trees are damaged, and fruit begins to spoil within 48 hours (and prices for the crop ultimately drop). Trees must then be pruned back to the bark freeze line. However, if the freeze is severe, trees will die anyway, necessitating replacement with a sapling one or two years old.

It requires five years of growth for a tree to begin paying for its care and maintenance. From five years, trees increase production each year for ten years. At fifteen to thirty years the citrus tree will produce its highest yield. From thirty to forty-five years, production declines. At forty-five years, the tree is replaced, and the cycle repeats itself.

To prevent a possible loss of a citrus grove and fifteen years production, there should be a better method of protecting the groves from elements over which we have no control.

Some groves are several hundred acres in size. A greenhouse would be the ideal protection for the groves during freezing temperatures, but it is not needed for the majority of time. A greenhouse capable of being installed and removed within minutes, and no storage problems when removed would be the ideal protection for any agricultural crop.

According to meteorologists, cloud cover keeps temperatures ten degrees warmer, by keeping the earth emitted heat from escaping to upper atmosphere. Possibilities immediately questioned were:

1. How could the protection of a greenhouse be only in freezing weather?
2. What if a greenhouse had an area that contains more heat than the clouds?
3. Could augmentation of the heat emitted from the earth be captured?
4. What material could be used for a cloud cover?
5. How could several hundred acres be covered?
6. How would such a cover be extended, then retrieved?
7. How would a cover be supported during use?
8. How would the cover be stored when not in use?
9. How will sides and ends be enclosed?

After spending time in citrus groves with the owners and studying weather conditions, the inventor came to the following answers to these questions.

1. Build a greenhouse in sections that can be extended and retracted.
2. Many modem materials have insulating abilities. Make them adaptable to this greenhouse.
3. If needed, additional heat with less pollution would be easy.
4. Any material with insulating abilities.
5. Erect the sections to allow the sheets to meet with little space for heat to escape.
6. A closed loop of cables.
7. Rollers mounted on top of tall post.
8. Spools with all necessary equipment for operation and control.
9. Sides will have smaller sheets for sides only. Ends will be covered when the top cover is put in place.

All fruit blossoms are sensitive to freeze in early spring. This same retractable greenhouse can be used in any area where the daylight temperature reaches above freezing. In addition, fields of tomatoes or other vegetables could be started 4 to 6 weeks earlier then is presently possible. Clean burning blower heaters can also be used to augment the heat emitted from the ground in extreme conditions. Flowers are imported to the U.S. during winter months, but with the retractable greenhouse, enough flowers can be grown here to significantly reduce imports. Thus, by extending the growing period, another harvest is possible.

All citrus areas (such as California, Arizona, Texas, as well as other countries) experience the same threat from weather condition as Florida.

The potential market for the present invention are farmers along the agriculture belt of North and South hemispheres where normal low temperatures range from twenty to thirty two degrees, and where late frost damage early blossoms of fruits and vegetable.

Numerous innovations for green houses have been provided in the prior art that are described as follows. Even though these innovations may be suitable for the specific individual purposes to which they address, they differ from the present invention as hereinafter contrasted.

In U.S. Pat. No. 4,763,440, dated Aug. 16, 1988, titled, System and Method For Protecting Plants From Freeze Damage, invented by James, comprises a system and method for protecting a ground plot of foliage plants or the like from freezing and contemplates a series of ground-level sprinklers throughout the plot and a shade cloth covering of the type having uniformly dispersed openings therein. Both elevated sprinklers above the shade cloth and ground-level sprinklers are provided. During periods of freezing ambient temperatures, water is sprinkled through the elevated sprinklers whereby the water freezes in the openings of the covering and holds heat released during operation of the ground-level sprinklers under the covering. When the water droplets freeze into a thin sheet of ice on the covering, the ground-level sprinklers are turned on.

The patented invention differs from the present invention due to the features that the patented invention utilizes a sprinkler system to prevent freezing and a permeable cloth covering which functions as a shade whereas the present invention utilizes a non-permeable covering which is capable of automatic covering and retraction.

In U.S. Pat. No. 4,798,023, dated Jan. 17, 1989, titled, Method of Controlling Environmental Conditions in the Proximity of Vegetation or Crops with the Aid of Protective Sheeting, Protective Sheeting for Use in this Method, and a Protective Device Comprising Sheeting, invented by Morssinkhof et al., comprises a method for controlling the environmental conditions in the proximity of vegetation or crops in the cultivation of plants is described in which use is made of protective sheets comprising a large number of micro perforations having each a protruded rim, said micro perforations having a diameter between 50 and 2,000 and being present in a density of between 25 and 40,000 micro perforations per $cm^2$. The invention relates to plastic sheeting for use in said method and to a protective device for use in a greenhouse provided with such sheeting.

The patented invention differs from the present invention due to the features that the patented invention utilizes a permeable permanently secured covering which functions as a respiration device whereas the present invention utilizes a non-permeable covering which is capable of automatic covering and retraction as well as being modular in design.

In U.S. Pat. No. 4,794,727, dated Jan. 3, 1989, titled, Wheel-About Greenhouse, invented by Smith, a portable wheel-about greenhouse is provided formed with a transparent top portion of double wall insulated construction configured to engage in interfitting relationship with a bed portion also formed of double wall construction providing further insulation to said bed thereby. Said transparent cover portion may be positioned in spaced relationship to said bed portion periodically by means of spacer elements positionable at respective corners of the bed and cover members. At least one pair of over-sized wheels is utilized for ease of portability and convenience in transport of said greenhouse from one site to another.

The patented invention differs from the present invention due to the features that the patented invention utilizes a portable greenhouse with a non-permeable rigid doubled walled top whereas the present invention utilizes a non-rigid covering which is capable of automatic covering and retraction as well as being modular in design.

In U.S. Pat. No. 5,311,699, dated May 17, 1994, titled, Shade House, invented by Huffman, a structure of a shade house is disclosed which is comprised of a plurality of upright posts with cables tensioned therebetween to provide a support for a shade producing fabric to be placed over a designated area. The structure is easy to assemble and includes improved structural elements such as the combination of a post with a separate top which supports the roof cable, and a separate earth anchor threadably driven into the ground. The roof is comprised of a number of supporting cables preferably forming a rectangular grid, and by a system of parallel holding cables which extend over the top surface of the roof fabric with the latter is installed. The fabric is installed by way of a plurality of strips which can be wound up and stored in the wound up position during winter months or the like.

The patented invention differs from the present invention due to the features that the patented invention utilizes vertical and horizontal posts which are interconnected therebetween having a plurality of non-rigid covering strips which are drawn on top of the structure whereas the present invention utilizes a non-permeable non-rigid covering which is capable of automatic covering and retraction on top an sides of the greenhouse thereby total encasement can be achieved. In addition, the present invention is modular in design and has an elaborate pulley and cable system utilized for raising and lowering the cover.

Numerous innovations for greenhouses have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is a greenhouse that can be erected (extended) and/or removed (retracted) within minutes for the purpose of protecting any agricultural crop from many hazards to the crop, and constructed in sections. It is modular in design with each section having an appropriate number and size posts, a cover sheet container at the ends and sides of a field, and contain a cover sheet roller spindle, cover sheet of material with pull and support cables, cover sheet motor and controls, as well as insecticide and fungicide dispensers.

The left-right cover sheet and front-rear cover sheet has support and pull cables fused in the appropriate positions to support and draw the sheets above or up the side of the crop to be protected. Cable guide, mounted on horizontal member from one end of the field to the other, will support the cover sheets and cables. The front-rear cover sheet are mounted at ground level or atop the post, and cover the sides of the field. The cover sheet motor pulls the sheets over the top, and up or down the sides, covering the entire agriculture field. The pull cables, powered by the cover sheet motor, extend from its cover sheet container over cover sheet roller spindles to the opposite end of the field, and up or down the sides to enclose the entire area, and return to its cover sheet roller spindle in the cover sheet container. While enclosed, the field is protected from freezing temperature, pests and some other hazards. When the sheets are rewound on their respective cover sheet roller spindle, insecticide and fungicide will be dispensed to protect and preserve them.

The cover is manufactured from one of the many materials now available with reflective surface toward the ground. Plastic covered steel, or plastic cables fused to the cover adds strength and support. For the width, wide sheets are fused together to cover a specific area; length presents no problem. Electric motors pull the cover sheets from a cover sheet roller spindle within the cover sheet container. The cover sheet roller spindle has guide notches for the support and pull cables. A closed loop of pull cables attached to the cover sheet, extending around return pulleys at opposite end of the field are utilized for extending and retracting the cover sheet. To extend, the cover sheet pays out as cover sheet motors are powering pull cables. Reversing the cover sheet motor direction powers pull cables fused to outer edges of the cover sheet. The pull cables pay back as the cover is rewound onto its spool. To give better machinery access to work the grove, cover sheet containers alternate ends of groves. Front-rear cover sheet roller spindles can be mounted on top of poles. The same type cover sheet can also be used to replace existing greenhouse damaged plastic covering. The vertical support posts, taller than the trees, have cable guides integrally within horizontal members across rows of trees supporting the cover laterally. Length is supported by an additional the number of vertical and horizontal post needed for the field of crops. A roller lock, mounted on top of each pole secures an adjacent cable guide with a cable guide bearing contained within a roller lock top and a roller lock bottom cover allowing the rollers to turn freely when cables and cover sheet are extended or retracted.

A cover sheet container of adequate size stows the cover sheet, cover sheet roller spindle, and cover sheet motor. The container has cable guides to maintain the cables in a straight line. The spool moves within its container to maintain cables in a level wind. The cover sheet container has dispensers for fungicide and insecticide applications on the cover sheet as it is returned to storage. Grove ends are covered by the cover sheet when fully extended. Sides of the greenhouse are enclosed by the same type cover sheets, extending only from the ground to edge of cover sheet.

The types of problems encountered in the prior art are most greenhouses are non-modular in design and require extensive construction to erect or collapse them.

In the prior art, unsuccessful attempts to solve this problem were attempted namely: greenhouses on wheels and flimsy constructed plastic coverings. However, the problem was solved by the present invention because of the modular design utilizing a matrix of vertical and horizontal post members.

Innovations within the prior art are rapidly being exploited in the field of agriculture to bring crops to remote areas which are presently uninhabitable.

The present invention went contrary to the teaching of the art which describes flimsy constructed crop covering devices which do not have retractable covers.

The present invention solved a long felt need of a modular designed greenhouse capable of easy assembly and disassembly in response to weather conditions.

The present invention produced unexpected results namely: by partially raising the front-rear cover sheets and/or the left-right cover sheet in response to wind direction, crops could be shielded from adverse weather conditions which cause wind blown crop damage where as the structure would remain intact due to the non-wind resistant design of the vertical and horizontal posts.

A synergistic effect was produced utilizing the present invention due to the following facts and results from experimentation: temperature regulation within the retractable greenhouse can be easily regulated by partially retracting and/or raising the front-rear cover sheets and/or the left-right cover sheet in response to the desired temperature. In addition a computer control panel could be utilized to automatically maintain a desired temperature accordingly.

Accordingly, it is an object of the present invention to provide a retractable greenhouse utilizing materials which are presently available and easily attainable on the open market.

More particularly, it is an object of the present invention to provide a retractable greenhouse utilizing a plurality of intersecting left-right horizontal members, front-rear horizontal members, left-right vertical support posts and front-rear vertical support posts.

In keeping with these objects, and with others which will become apparent hereinafter, one feature of the present invention resides, briefly stated, in the horizontal members have cable guide integrally positioned thereon.

When the retractable greenhouse is designed in accordance with the present invention, the cable guides have cable guide bearings to facilitate rotation thereof In accordance with another feature of the present invention, the left-right cover sheet is raised and retracted utilizing a serpentine pull and support cable arrangement where the support cables are guided in separate support cable guides and the pull cables are guided on separate pull cable guides.

Another feature of the present invention is that the pull and support cables attach to a junction bar.

Yet another feature of the present invention is that the junction bar also attaches the cover sheet functioning facilitate and strengthen the raising and lowering thereof Still another feature of the present invention is that the vertical posts are each additionally supported by a support brace.

Yet still another feature of the present invention is that cover sheet motor and the cover sheet roller spindle are housed within a cover sheet container.

Still yet another feature of the present invention is that cover sheet container has a cover sheet applicator upon which insecticide and/or fungicide can be applied thereon. Upon retraction and raising of the coversheet, the insecticide and/or fungicide is automatically applied to the cover sheet since the cover sheet is in constant contact with the cover sheet applicator during retraction and raising thereof.

Another feature of the present invention is that the roller lock has a roller lock top cover and a roller lock bottom cover which are movably affixed to one another by a roller lock hinge.

Yet another feature of the present invention is that roller lock has a roller lock latch positioned at an opposite end of the roller lock from the roller lock hinge. The roller lock latch functions to maintain the roller lock in a closed position when in use.

The novel features which are considered characteristic for the invention are set forth in the appended claims. The invention itself however, both as to its construction and its method of operation, together with additional objects and advantages thereof, will be best understood from the following description of the specific embodiments when read and understood in connection with the accompanying drawing(s).

BRIEF LIST OF REFERENCE NUMERALS UTILIZED IN THE DRAWING

10—retractable greenhouse (10)

12A—left-right horizontal member (12A) cover sheet roller with built in cable guides 12B—front-rear horizontal member (12B) side sheet roller with built in cable guides 14A—left-right vertical support post (14A)

14B—front-rear vertical support post (14B)

16AA—left-right support cable guide (16AA)

16AB—left-right pull cable guide (16AB)

16ABA—left-right pull cable guide bearing (16ABA)

16AC—left-right support cable second guide (16AC)

16AD—left-right support cable third guide (16AD)

16AE—left-right support cable forth guide (16AE)

16AF—left-right pull cable first guide (16AF)

16BA—front-rear support cable guide (16BA)

16BB—front-rear pull cable guide (16BB)

18AA—left-right support cable (18AA)

18AB—left-right pull cable (18AB)

18BA—front-rear pull-support cable (18BA)

22A—left-right junction bar (22A)

22AA—left-right junction bar support cable openings (22AA)

22AB—left-right junction bar pull cable openings (22AB)

22B—front-rear junction bar (22B)

24—side support brace (24)

26A—left-right cover sheet (26A)

26AA—left-right cover sheet container (26AA)

26AB—left-right cover sheet motor (26AB)

26AC—left-right cover sheet roller spindle (26AC)

26AD—left-right cover sheet applicator (26AD)

26B—front-rear cover sheet (26B)

26BA—front-rear cover sheet container (26BA)

26BB—front-rear cover sheet motor (26BB)

26BC—front-rear cover sheet roller spindle (26BC)

26BD—front-rear cover sheet applicator (26BD)

28—roller lock (28) mounted on top of each support post 14A and 14B

28A—roller lock top cover (28A)

28B—roller lock bottom cover (28B)

28C—roller lock hinge (28C)

28D—roller lock latch (28D)

28E—roller lock vertical support post housing (28E)

BRIEF DESCRIPTION OF THE PREFERRED EMBODIMENT

DETAILED DESCRIPTION OF THE PREFERRED EMBODIMENT

Figure 1:
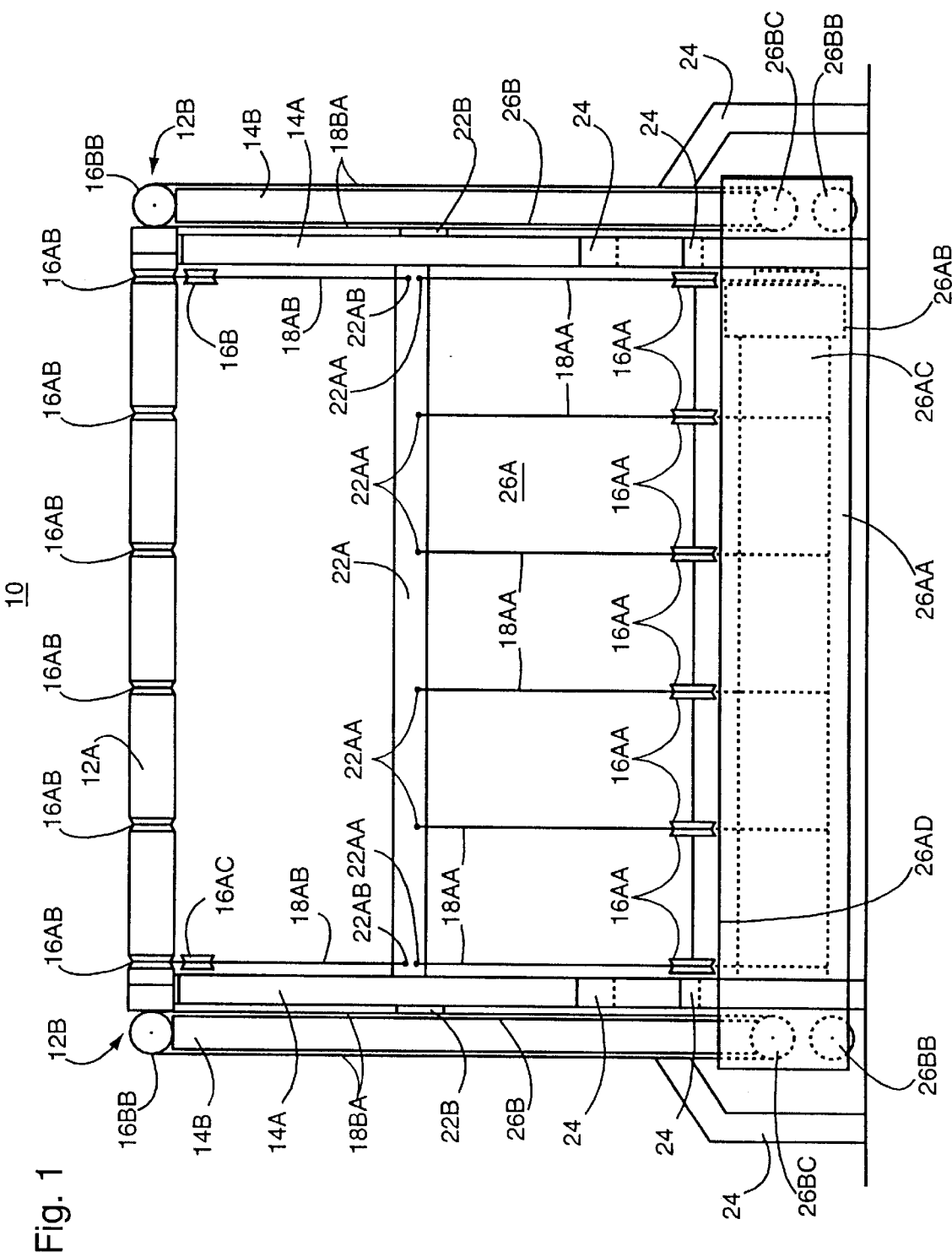
FIG. 1 is a front view of a retractable greenhouse.

Firstly, referring to FIG. 1 which is a front view of a retractable greenhouse (10). The frame structure of the retractable greenhouse (10) consists of a left-right vertical support post (14A) which is supported at a left and right distal end by a left-right vertical support post (14A). Integrally mounted upon the left-right vertical support post (14A) are at least two left-right pull cable guides (16AB). The outer most distal left-right pull cable guides (16AB) rollably guide a pair of left-right pull cables (18AB), each outer most distal left-right pull cable guide (16AB) guiding one left-right pull cable (18AB) thereon. Each left-right pull cable (18AB) is attached at a front distal end to a left-right junction bar (22A). When the left-right pull cable (18AB) is retracted in an upward and rearward direction, the left-right junction bar (22A) is raised. The left-right junction bar (22A) also has a plurality of left-right support cables (18AA) and a left-right cover sheet (26A) attached thereto. The left-right support cables (18AA) are guided by a plurality of corresponding left-right support cable guides (16AA). The left-right support cables (18AA) terminate in a left-right cover sheet container (26AA) which contains a left-right cover sheet roller spindle (26AC). When the left-right cover sheet roller spindle (26AC) is rotated in one direction by a left-right cover sheet motor (26AB), the left-right support cables (18AA) are reeled upon the left-right cover sheet roller spindle (26AC) and concurrently the left-right junction bar (22A) is lowered. Oppositely, when the left-right pull cable (18AB) is retracted in an upward and rearward direction, the left-right junction bar (22A) is raised and concurrently, the left-right support cables (18AA) are unreeled from the left-right cover sheet roller spindle (26AC). Concurrently, the left-right cover sheet (26A) is also reeled on and from the left-right cover sheet roller spindle (26AC). Both the left-right cover sheet roller spindle (26AC) and the left-right cover sheet motor (26AB) are housed in a left-right cover sheet container (26AA) functioning to protect them from the elements of the weather.

Positioned on opposite distal sides adjacent to the left-right horizontal members (12A) are front-rear vertical support posts (14B) each of which support a front-rear horizontal member (12B). Integrally mounted upon the front-rear horizontal members (12B) are at least two front-rear pull cable guides (16BB). Each of the front-rear pull cable guides (16BB) has a front-rear pull-support cable (18BA) thereon. Each front-rear pull-support cable (18BA) is attached at one distal end to a top of front-rear junction bar (22B) and at an opposite distal end to bottom of front-rear junction bar (22B) wrapping around a front-rear cover sheet roller spindle (26BC) which is rotated by front-rear cover sheet motor (26BB).

Each of the front-rear vertical support posts (14B) are supported by a side support brace (24). Each of the left-right vertical support posts (14A) are supported by a side support brace (24).

Figures 1, 2A:
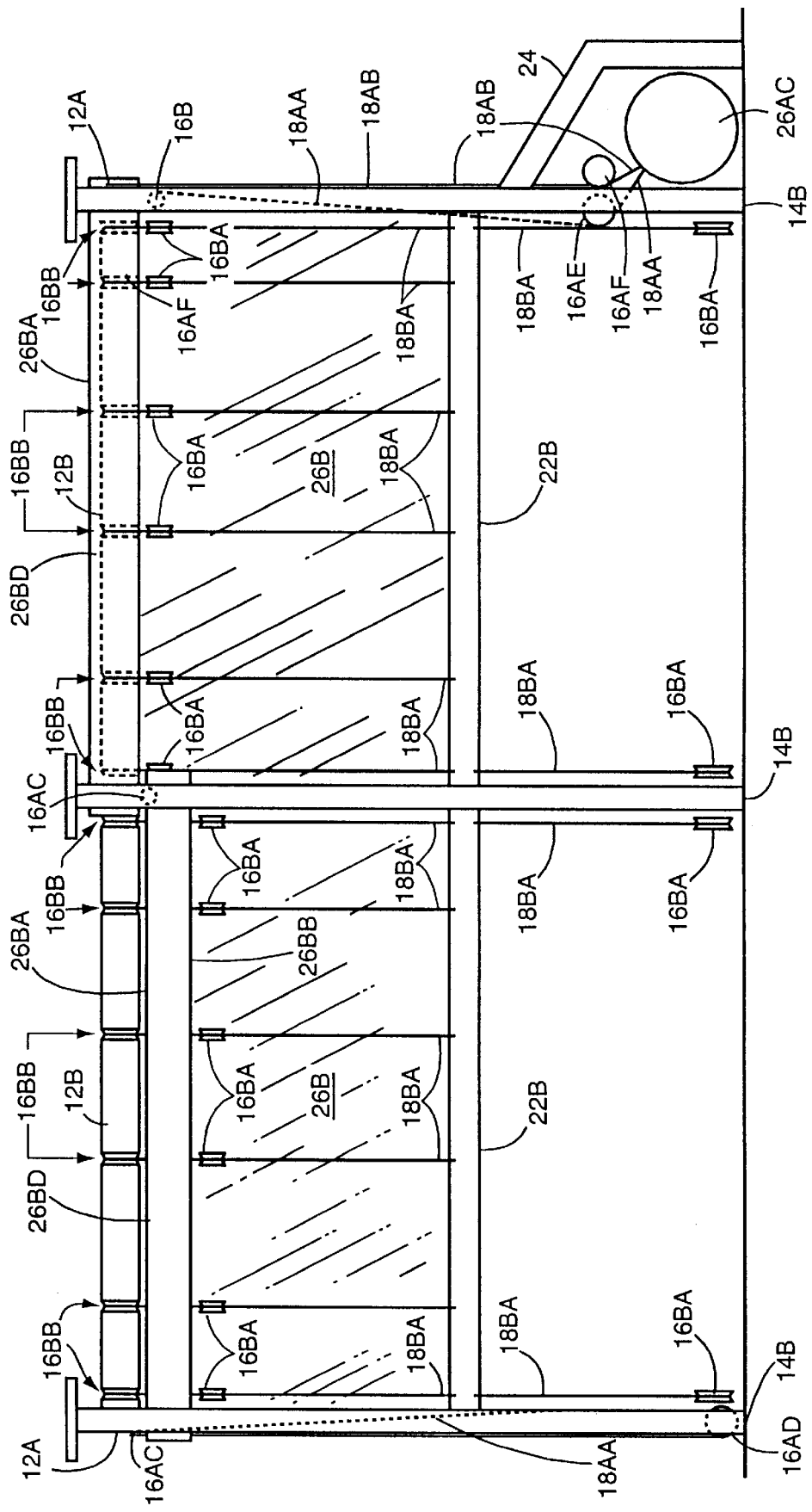
Figures 2, 2A:
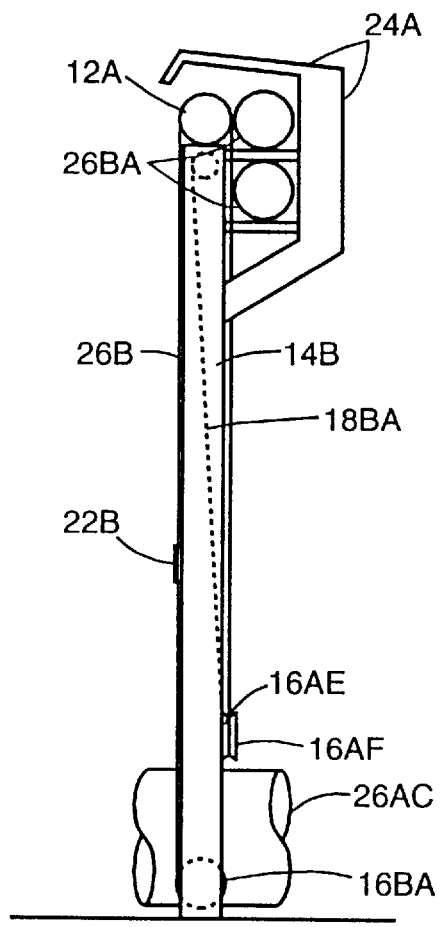
FIG. 2 is a left side view of a retractable greenhouse.

Now referring to FIG. 2 which is a left side view of a retractable greenhouse (10). The front-rear horizontal member (12B) has at least two front-rear integrally mounted thereon. Each of the front-rear pull-support cables (18BA) ride upon a front-rear pull cable guide (16BB). Each of the front-rear pull-support cables (18BA) are connected at one distal end to a top of a front-rear junction bar (22B) and at an opposite distal end to a bottom of a front-rear junction bar (22B). Each of the front-rear pull-support cables (18BA) wrap around a corresponding front-rear pull cable guide (16BB) at a top and concurrently wrap around a front-rear cover sheet roller spindle (16BA) at a bottom. When the front-rear cover sheet roller spindle (26BC) is rotated by the front-rear cover sheet motor (26BB), the front-rear cover sheet (26B) is raised or lowered concurrently. The front-rear cover sheet (26B) is affixed to the front-rear junction bar (22B) and reels upon and from the front-rear cover sheet roller spindle (26BC). Both the front-rear cover sheet roller spindle (26BC) and the front-rear cover sheet motor (26BB) are encased within a front-rear cover sheet container (26BA) which functions as a barrier to the weather.

The left-right pull cables (18AB) are initially wrapped around the left-right cover sheet roller spindle (26AC) and thereafter are guided upon a left-right pull cable first guide (16AF). Both the left-right cover sheet roller spindle (26AC) and the left-right pull cable first guide (16AF) are encased within the left-right cover sheet container (26AA).The left-right pull cables (18AB) are guided on the left-right pull cable guides (16B) and the left-right pull cable second guides (16AC) located in the front end of the retractable greenhouse (10) and then are guided on a second set of left-right pull cable guides (16AB) and the left-right pull cable second guides (16AC) positioned at the rear of the retractable greenhouse (10). The left-right pull cables (18AB) then are guided on around the left-right support cable third guide (16AD) which are rotatably affixed at a bottom distal end of the front-rear vertical support posts (14B). The left-right pull cables (8AB) then are "termed", "left-right support cables (18AA)" and are guided on the second set of left-right pull cable second guides (16AC) which are rotatably affixed to the rear set of front-rear vertical support posts (14B). The left-right support cables (18AA) then are guided on the left-right pull cable second guides (16AC) which are rotatably affixed to the front set of front-rear vertical support posts (14B). The left-right support cables (18AA) then are guided on a left-right support cable forth guide (16AE) and then after wrap around the left-right cover sheet roller spindle (26AC). Both the left-right support cable forth guide (16AE) and the left-right cover sheet roller spindle (26AC) left-right cover sheet container (26AA).

Figures 2, 2A, 3:
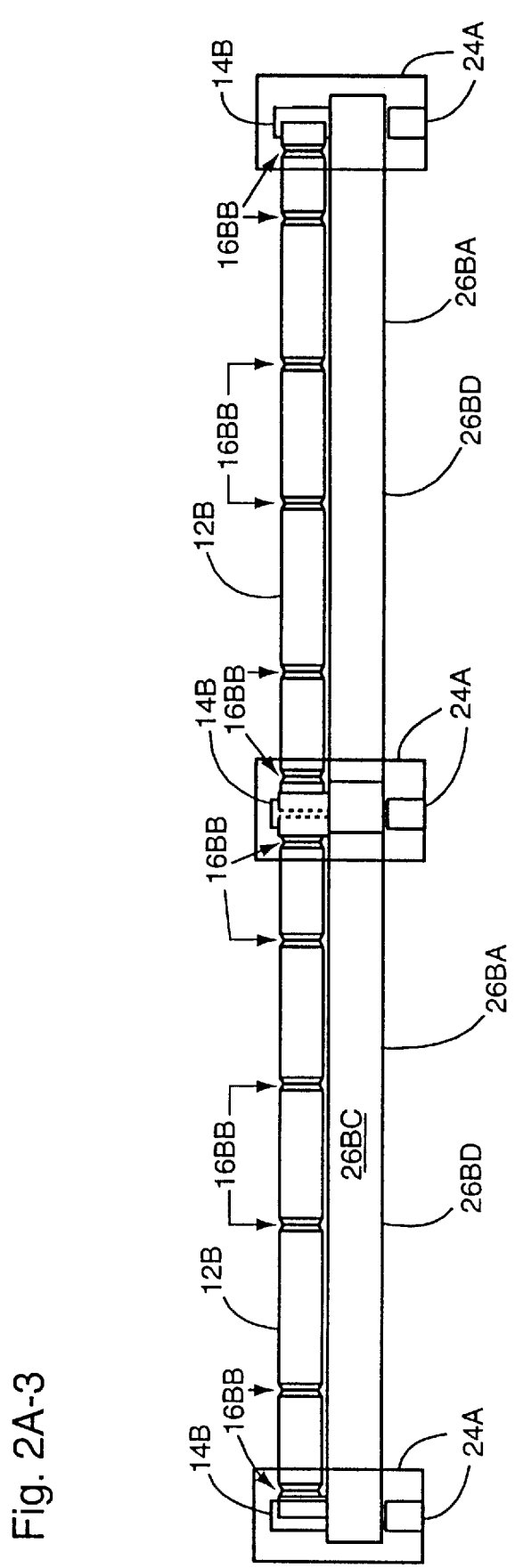
FIG. 3 is a partial top view of a retractable greenhouse.
Figure 3:
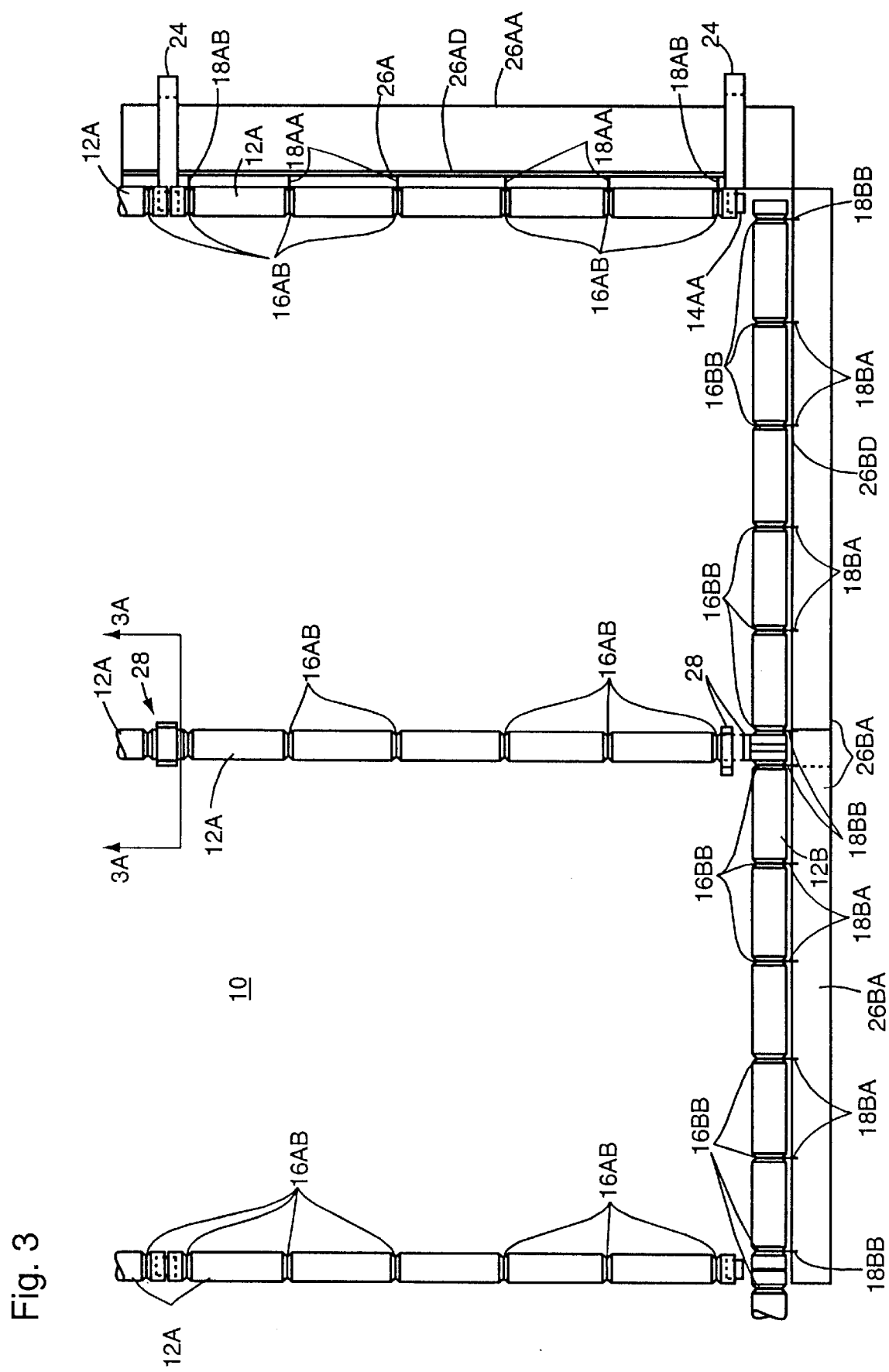
Figure 3A:
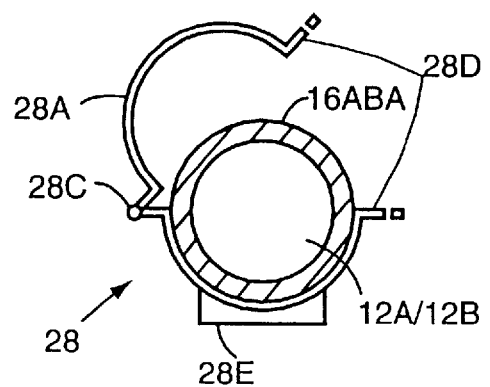

Referring now to FIG. 3 which is a partial top view of a retractable greenhouse (10). The left-right pull cable (18AB) is guided upon a first set of left-right pull cable guides (16AB) positioned on a front left-right horizontal member (12A) and then after is guided upon a second set of left-right pull cable guides (16AB) positioned on a middle left-right horizontal member (12A) and hence, is guided upon a third set of left-right pull cable guides (16AB) positioned on a rear left-right horizontal member (12A). The other left-right pull cable guides (16AB) positioned between the distal end left-right pull cable guides (16AB) function to guide the left-right support cable (18AA) when the left-right cover sheet (26A) is raised and lowered to cover and uncover the retractable greenhouse (10). The front-rear pull-support cables (18BA) are guided over the front-rear horizontal member (12B) by the front-rear pull cable guides (16BB) which are positioned thereon.

All horizontal members (12A) and (12B), with cable guides (16AB) and (16BB), has a roller lock (28), which functions to secure horizontal members (12A) and (12B) to support post (14A) and (14B). The roller rock (28) is composed of a roller lock top cover (28A) and lock hinge (28C). In addition, the roller lock (28) has a roller lock latch (28D) whereby the roller lock top cover (28A) and roller lock bottom cover (28B) are securably fastened to each other when positioned around the horizontal members (12A) and (12B). The left-right horizontal members (12A) and (12B) bearing (16ABA) which functions to allow the left-right horizontal member (12A) and (12B) to freely rotate within the roller lock (28). Positioned at a bottom end of the roller lock (28) is a roller lock vertical support post housing (28E) within which a left-right vertical support post (14A) and/or a front-rear vertical support post (14B) is inserted The roller lock vertical support post housing (28E) attaches each of the left-right horizontal member (12A) and the front-rear horizontal member (12B) to each of their respective left-right vertical support post (14A) and front-rear vertical support post (14B).

The left-right cover sheet applicator (26AD) is positioned on the leading longitudinal edge of the opening of the left-right cover sheet container (26AA) through which the left-right cover sheet (26A) is inserted. The left-right cover sheet applicator (26AD) is a standard sponge-type applicator upon which an insecticide and/or fungicide is applied which in turn applies the same to the left-right cover sheet (26A) when it is raised from or lowered into the left-right cover sheet container (26AA). Concurrently, the front-rear cover sheet applicator (26BD) is positioned on the leading longitudinal edge of the opening of the front-rear cover sheet container (26BA) through which the front-rear cover sheet (26B) is inserted. The front-rear cover sheet applicator (26BD) is a standard sponge-type applicator upon which an insecticide and/or fungicide is applied which in turn applies the same to the front-rear cover sheet (26B) when it is raised from or lowered into the front-rear cover sheet container (26BA).

Figure 4:
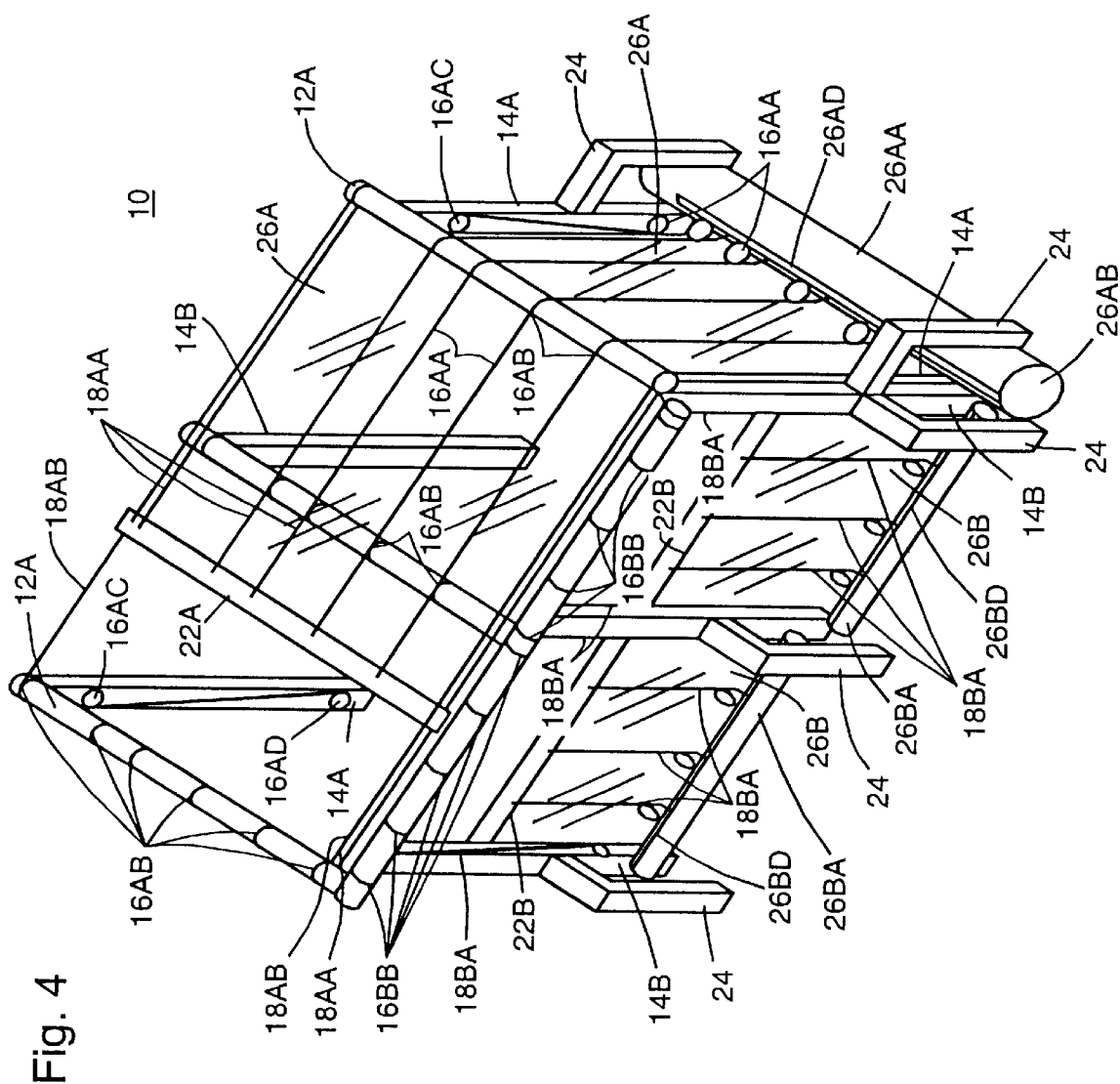
FIG. 4 is a top left-front perspective view of a retractable greenhouse.

Lastly, referring to FIG. 4 which is a top left-front perspective view of a retractable greenhouse (10). The left-right cover sheet (26A) is presently covering the front and partially the top of the retractable greenhouse (10). Notice how the left-right pull cable guides (16AB) guide the left-right support cables (18AA) thereon. In addition, notice how the front-rear pull-support cables (18BA) are guided on and over the front-rear pull cable guides (16BB). The left-right horizontal members (12A), front-rear horizontal members (12B), left-right vertical support posts (14A), front-rear vertical support posts (14B), and side support braces (24) are constructed from a group of materials consisting of metal, metal alloy, plastic, plastic composite, rubber, rubber composite, epoxy, fiberglass, carbon-graphite and wood.

It will be understood that each of the elements described above, or two or more together, may also find a useful application in other types of constructions differing from the type described above.

While the invention has been illustrated and described as embodied in a retractable greenhouse, it is not intended to be limited to the details shown, since it will be understood that various additions, omissions, modifications, substitutions and changes in the forms and details of the device illustrated and in its operation can be made by those skilled in the art without departing in any way from the spirit of the present invention. The invention is intended to cover areas of any size, even to one thousand or more acres of agriculture by adding modules end to end, and side to side.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A retractable greenhouse, comprising:
   (a) a front-rear horizontal member having two distal ends and including two front-rear cable pull guides integrally mounted on said front-rear horizontal member;
   (b) two front-rear vertical support posts, each said front-rear vertical support post being positioned at and attached to one of said distal ends of said front-rear horizontal member;
   (c) a front-rear cover sheet roller spindle attached to each of said front-rear vertical support posts;
   (d) a plurality of front-rear pull-support cables which wrap around said front-rear cable pull guides and said front-rear cover sheet roller spindle and are attached to a front-rear junction bar;
   (e) a front-rear cover sheet attached to said front-rear junction bar and wrapped around a front-rear cover sheet roller spindle;
   (f) a front-rear cover sheet motor which rotates said front-rear cover sheet spindle to raise and lower said front-rear cover sheet;
   (g) a front left-right horizontal member and a rear left-right horizontal member, each having two distal ends and including two left-right cable pull guides integrally mounted on each said left-right horizontal member, each said left-right horizontal member being placed adjacent one said front-rear horizontal member;
   (h) two front left-right vertical support posts, each said left-right vertical support post being positioned at and attached to one of said distal ends of said front left-right horizontal member and two rear left-right vertical support posts, each said left-right vertical support post being positioned at and attached to one of said distal ends of said rear left-right horizontal member;
   (i) a plurality of left-right support cable guides mounted on a shaft, said shaft being suspended from each said front left-right vertical support post;
   (j) a plurality of left-right support cables attached to a left-right junction bar and which reel on said plurality of left-right support cable guides;

(k) a plurality of left-right pull cables attached to said left-right junction bar and which cooperate with said left-right pull cable guides, said plurality of left-right pull cables being further attached to a left-right cover sheet roller spindle attached to each said front left-right vertical support post;

(l) a left-right cover sheet attached to said left-right junction bar and wrapped around said left-right cover sheet roller spindle; and (m) a motor which rotates said left-right cover sheet roller spindle to raise and lower said left-right cover sheet.

2. The retractable greenhouse as described in claim 1, wherein the left-right pull cable guides further comprises a roller lock.

3. The retractable greenhouse as described in claim 2, wherein the roller lock further comprises a roller lock top cover movably attached to a roller lock bottom cover by a roller lock hinge at one end and the roller lock top cover securely attachable to the roller lock bottom cover by a roller lock latch at an opposite distal end.

4. The retractable greenhouse as described in claim 3, wherein the roller lock further comprises a roller lock vertical support post housing functioning to securely mount the roller lock on the front-rear vertical support post.

5. The retractable greenhouse as described in claim 4, wherein the roller lock further comprises a left-right pull cable guide bearing functioning to allow the left-right pull cable guide to rotate freely therein.

6. The retractable greenhouse as described in claim 1, wherein each said left-right vertical support post further comprises a side support brace.

7. The retractable greenhouse as described in claim 1, wherein each said front-rear vertical support post further comprises a side support brace.

8. The retractable greenhouse as described in claim 1, wherein the left-right cover sheet motor and the left-right cover sheet roller spindle are encased within a left-right cover sheet container.

9. The retractable greenhouse as described in claim 8, wherein the left-right cover sheet container further comprises a left-right cover sheet applicator.

10. The retractable greenhouse as described in claim 1, wherein the front-rear cover sheet motor and the front-rear cover sheet roller spindle are encased within a front-rear cover sheet container.

11. The retractable greenhouse as described in claim 10, wherein the front-rear cover sheet container further comprises a front-rear cover sheet applicator.

12. The retractable greenhouse as described in claim 1, wherein the left-right horizontal members, front-rear horizontal members (12B), left-right vertical support posts, front-rear vertical support posts (14B), and side support braces are constructed from a group of materials consisting of metal, metal alloy, plastic, plastic composite, rubber, rubber composite, epoxy, fiberglass, carbongraphite and wood.

* * * * *